United States Patent [19]

Rinn

[11] Patent Number: 4,732,486
[45] Date of Patent: Mar. 22, 1988

[54] CONTACT-FREE OPTICAL LINEAR MEASUREMENT DEVICE

[75] Inventor: Jurgen Rinn, Launsbach, Fed. Rep. of Germany

[73] Assignee: Heyligenstaedt & Comp. Werzeugmaschinenfabrik GmbH, Fed. Rep. of Germany

[21] Appl. No.: 787,673

[22] Filed: Oct. 15, 1985

[30] Foreign Application Priority Data

Oct. 12, 1984 [DE] Fed. Rep. of Germany ....... 3437412

[51] Int. Cl.$^4$ ............................................. G01B 11/08
[52] U.S. Cl. .................................... 356/387; 356/386
[58] Field of Search ............... 356/383, 384, 385, 386, 356/387; 250/560

[56] References Cited

U.S. PATENT DOCUMENTS 3,621,266 11/1971 Akuta et al. ..................... 356/383

FOREIGN PATENT DOCUMENTS 0101708 6/1982 Japan ..................... 356/386

Primary Examiner—Evans F. L.
Attorney, Agent, or Firm—Wegner & Bretschneider

[57] ABSTRACT

A contact free, optical linear measurement device comprising a beam of light that is emitted by a laser and this is displaced parallel to itself within a first beam path. A semi-reflecting mirror reflects the light of the first beam path to a path-diverting mirror, in this way generating a second beam path, the course of which is parallel to, and at a fixed distance from, the first beam path. An object to be measured is positioned at right angles in relation to and within the two beam paths. Light sensors receive dark and light signals in the respective beam paths behind the object to be measured. By means of an electronic evaluating unit an inclination of the object to be measured can be determined and the exact diameter of the object to be measured can be calculated, without being influenced by its inclination.

7 Claims, 3 Drawing Figures

CONTACT-FREE OPTICAL LINEAR MEASUREMENT DEVICE

BACKGROUND OF THE INVENTION

This invention relates to a contact-free optical linear measurement device. More particularly, this invention relates to a measurement device in which a beam path, formed by a beam of light which is emitted by a point source of light and which is displaced parallel in relation to itself, is guided from one side of an object to be measured at right angles in relation to the object to a light sensor through a collective lens on the other side of the object to be measured, with said linear measurement device further having an electronic evaluating unit for determining the length of the object to be measured in the beam path on the basis of the dark and light signals of the light sensor.

Linear measurement devices of this type are for example used for determining the exact diameter of workpieces and are commonly known. As an example of the state of the art the laser-micrometer of Messrs. Oriel GmbH, of Darmstadt, West Germany, which is available on the market and known under the designation "zygo" is mentioned.

In the linear measurement device already known, a laser beam is periodically sent through a collimating lens by means of a rotating mirror. The collimating lens deflects the laser beam in a manner that the beam is displaced parallel to itself as a function of the rotation of the rotating mirror. A collective lens concentrates all beams of light that were received by the collimating lens in one point where a light sensor is positioned.

If an opaque object is held in the space between the collimating lens and the collective lens and provided that beams of light can still get from the collimating lens to the collective lens and hence to the light sensor above and below the object to be measured, the dimensions of the object to be measured can be determined in the plane formed by the beam of light being displaced parallel to itself behind the collimating lens by the rotating mirror by evaluating the period of time during which no beam of light reaches the light sensor.

If, for example, the diameter of a shaft is to be determined by means of a linear measurement device of this type, it is essential that the shaft be exactly vertical in relation to the plane formed by the moving beam of light, since otherwise a greater value would be measured. This exact alignment, however, necessitates great effort and takes up additional time.

SUMMARY OF THE INVENTION

It is a primary object of this invention to provide a linear measurement device of the type described at the outset in such a manner that the need for exact alignment of the object to be measured in relation to the linear measurement device is obviated.

This object is realized according to the invention by providing a second beam path guided to a second light sensor via the object to be measured and through a second collective lens, with the second beam path being parallel, and at a fixed distance in relation, to the first beam path. An electronic evaluating unit is provided to determine the degree of inclination of the object to be measured in relation to the plane formed by the two beam paths and to determine the measured length of the object without being influenced by the inclination of the object.

With a linear measurement device of this type the inclination of the object to be measured is determined first. Then, taking the inclination into account, the diameter running at right angles in relation to the object is determined on the basis of the measured length running at an inclined angle in relation to the object. This obviates the need for the time-consuming and fault-prone alignment of the object.

The linear measurement device according to the invention may have two sources of light arranged parallel to each other for purposes of generating the two beam paths. It is, however, more economical and preferred to use a single source of light with a rotating mirror driven by a motor and with a collimating lens for both beam paths. A semi-reflecting mirror is arranged behind the collimating lens for purposes of dividing the beam to generate the second beam, with the semi-reflecting mirror guiding the beam of light to a path-diverting mirror which generates a second beam path aligned parallel to the first beam path.

BRIEF DESCRIPTION OF THE DRAWINGS

The invention itself, as well as additional advantages and features thereof, will be more readily and comprehensively understood from the following detailed description of the preferred inventive embodiments, such description making reference to the appended sheets of drawings, wherein.

DETAILED DESCRIPTION OF THE PREFERRED EMBODIMENTS

Figure 1:
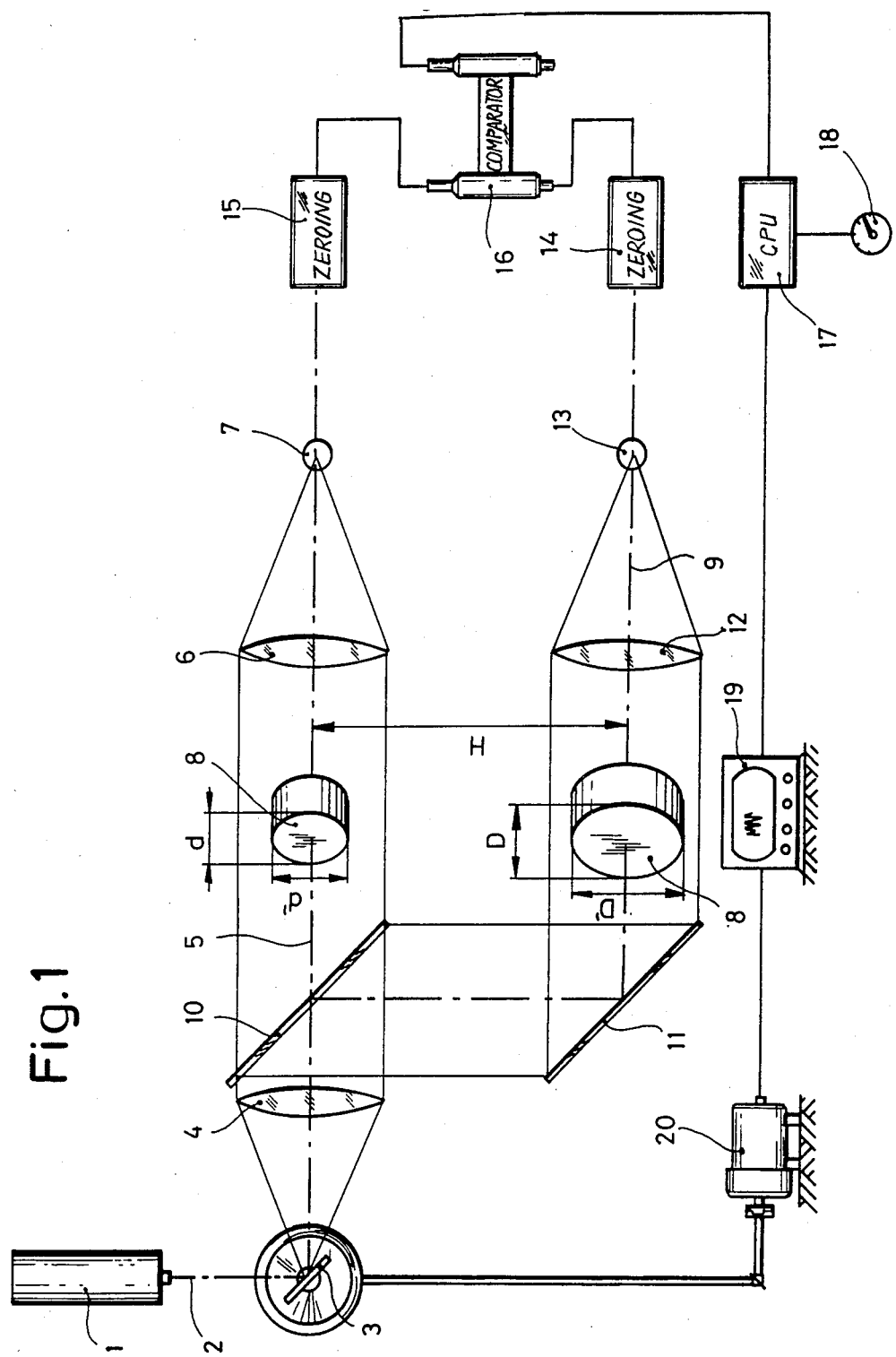
FIG. 1 is a block diagram of a linear measurement device according to the invention.

FIG. 1 shows a laser 1 as the source of light emitting a beam of light 2 to a rotating mirror 3 driven by a motor. As a function of the uniform rotation of the rotating mirror 3, the beam of light 2 of the laser 1 is guided at a varying angle to the collimating lens 4 which generates a first beam path 5 forming a beam of light that is constantly displaced parallel to itself. In other words, the beam 5 constantly moves up-and-down as seen in FIG. 1. A light sensor 7 receives the light via a collective lens 6.

An object to be measured 8, representing a shaft having a diameter d in the range of the beam path 5, is positioned within and at right angles in relation to the beam path 5. This object to be measured is, however, not aligned at exactly right angles in relation to the beam path 5, but at a slight inclination, so that it appears elliptical in the range of the beam path 5 and apparently has a slightly greater height d' than that corresponding to its actual diameter. With a conventional linear measurement device, this would result in an incorrect measurement caused by the inclination of the object to be measured.

In order to avoid such incorrect measurement and in order to take the inclination into account, a second beam path 9 is arranged at a fixed distance H and parallel to the beam path 5, with the beam path 9 also receiving light from laser 1. For this purpose, a semi-reflecting mirror 10 is arranged behind the collimating lens 4 in the first beam path 5 and at an angle of 45°. A further, fully-reflecting mirror 11 reflects the light parallel to the first beam path 5, in this manner generating the second beam path 9. The light of the second beam path 9 also reaches a light sensor 13 through a collective lens 12.

Behind the light sensors 7 and 13 there is disposed zeroing units 14 and 15, respectively. A mutual comparator 16 is connected to both light sensors. These components are connected to an electronic evaluating unit 17. For the sake of completeness, a measuring display 18 with the data outputs, an oscillator 19 and a motor control 20 for the rotating mirror are provided.

Figure 2:
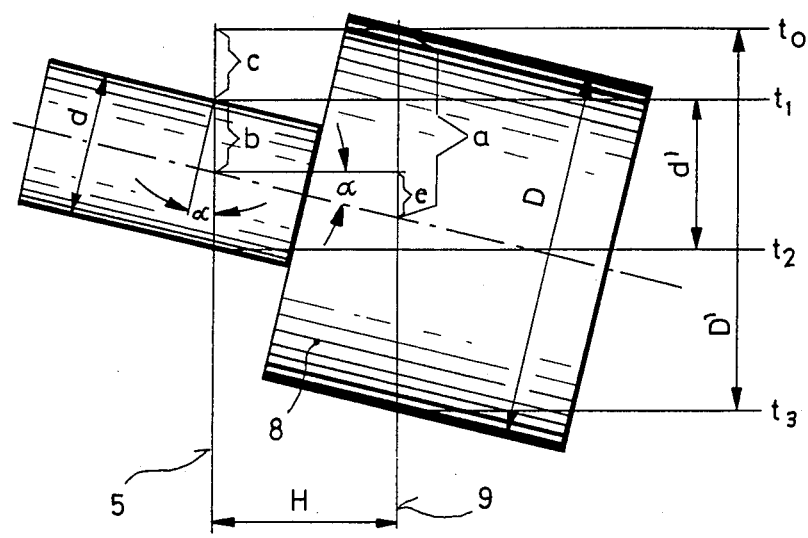
FIG. 2 is exemplary of a stepped workpiece arranged at an inclined angle and serving as the object to be measured.
Figure 3:
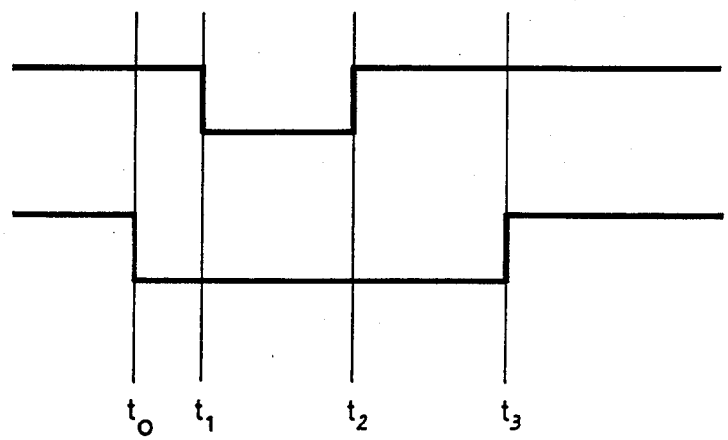
FIG. 3 is the signal curve at the light sensor of the linear measurement device.

The object to be measured 8 is defined to have a diameter D in the second beam path 9 and to have an apparent height D' in the measuring plane due to its inclination. While the laser 1 is emitting light, the light is first blocked in the beam path 9 at the point in time $t_o$, as is shown in FIG. 2. This is followed by a blocking-out of the light at the point in time $t_1$ in the beam path 5 which is terminated at the point in time $t_2$. Blocking-out of the light in the beam path 9 is terminated at the point in time $t_3$. In FIG. 3 the signal curve of the light sensor 7 is illustrated above the signal curve of the light sensor 13. The angle $\alpha$ (FIG. 2) that is to say the inclination of the object to be measured 8 can first be calculated on the basis of the dark and light signals of the light sensors 7 and 13. The following equation results:

$$\tan \alpha = e/H$$

with $$e = a - b - c$$

and $$a = C(t_3 - t_0)$$

$$b = C(t_2 - t_1)$$

$$C = (t_1 - t_0)$$

with C being a constant for translating into the desired units, in this example, 0.5. This results in $\tan \alpha = 0.5(t_3 - t_0) - [t_1 - t_0 + 0.5(t_2 - t_1)]/H$ Subsequently, $\cos \alpha$ is calculated. This allows calculation of $$d = d' \cos \alpha$$

and $$D = D' \cos \alpha.$$

These calculations are effected automatically in the electronic evaluating unit 17.

It should now be apparent that the objects initially set forth at the outset to this specification have been successfully achieved. Moreover, while there is shown and described present preferred embodiments of the invention, it is to be distinctly understood that the invention is not limited thereto, but may be otherwise variously embodied and practiced within the scope of the following claims.

What is claimed is:

1. A contact-free, optical linear measurement device for measuring an object comprising first means for generating a first beam of light which is constantly displaced along mutually parallel paths within a first defined area; first sensor means for sensing said first beam; second means for generating a second beam of light which is constantly displaced along mutually parallel paths within a second defined area and at a fixed distance from the paths of said first beam; second sensor means for sensing said second beam; said object being interposed between said beam generating means and said sensing means; and means for determining the degree of inclination of said object in relation to the plane formed by the two beam paths and for determining a linear measure of said object independent of the inclination thereof as a function of dark and light signals from said first sensor.

2. A contact-free, optical linear measurement device according to claim 1, further comprising first and second collective lenses disposed in said first and second beam paths, respectively, between said object and said first and second sensors, respectively, to focus said beams on said sensors.

3. A contact-free optical linear measurement device according to claim 2, wherein said first means for generating a first beam of light comprises a source of coherent light emitting a beam thereof, means for constantly displacing said beam, and collimating lens means to direct said beam within said first defined area.

4. A contact-free optical linear measurement device according to claim 3, wherein said displacing means comprises a rotating mirror.

5. A contact-free optical linear measurement device according to claim 4, wherein said second means for generating a second beam of light comprises a semi-reflecting mirror disposed between said collimating lens means and said object to direct a part of said first beam in a predetermined direction away therefrom; and a mirror disposed to catch said part of said first beam and direct it in a direction parallel to said first beam and at a fixed distance therefrom.

6. A method of measuring an object comprising the steps of providing a first beam of light which is constantly displaced along mutually parallel paths within a first defined area; providing a second beam of light which is constantly displaced along mutually parallel paths within a second defined area and at a fixed distance from the paths of said first beam; placing said object across said beams; sensing said beams to provide signals corresponding to light and dark portions in said areas; determining the degree of inclination of the object in relation to the plane formed by the two beam paths; and determining a linear measure of the object independent of the inclination thereof responsive to dark and light signals.

7. A method of measuring an object according to Claim 6, wherein the linear measure of the said object is determined according to the relationships:

$$\tan \alpha = e/H \qquad (A)$$

where
$e = a - b - c$
$a = C(t_3 - t_0)$;
$b = C(t_2 - t_1)$;
$c = (t_1 - t_0)$;
C is a constant;
H is the distance between the two beam paths;
$t_o$ is the starting time when the second beam path is blacked out;
$t_1$ is the time when the first beam path is blacked out;

$t_2$ is the time when the first beam path is not blacked out;

$t_3$ is the time when the second beam path is not blacked out;

(B) $d = d'\cos\alpha$; and $D = D'\cos\alpha$; and where d is the actual linear size of the object in the first beam path;

d' is the apparent linear size of the object in the first beam path due to its inclination;

D is the actual linear size of the object in the second beam path; and

D' is the apparent linear size of the object in the second beam path due to its inclination.

* * * * *